US011225346B1

(12) United States Patent
Meiswinkel

(10) Patent No.: US 11,225,346 B1
(45) Date of Patent: Jan. 18, 2022

(54) PNEUMATIC MANDREL FOR A PACKAGING SYSTEM

(71) Applicant: Amazon Technologies, Inc., Seattle, WA (US)

(72) Inventor: Kent Belden Meiswinkel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/878,159

(22) Filed: May 19, 2020

(51) Int. Cl.
*B65B 35/28* (2006.01)
*B65G 51/03* (2006.01)
*B65B 35/22* (2006.01)

(52) U.S. Cl.
CPC ............. *B65B 35/28* (2013.01); *B65B 35/22* (2013.01); *B65G 51/03* (2013.01)

(58) Field of Classification Search
CPC .......... B65B 35/28; B65B 35/22; B65G 51/03
USPC ....................................................... 198/493
See application file for complete search history.

(56) References Cited

U.S. PATENT DOCUMENTS

| 7,121,399 | B2 * | 10/2006 | Mills | ........................ | B07C 5/363 |
|---|---|---|---|---|---|
| | | | | | 198/438 |
| 10,996,852 | B2 * | 5/2021 | Hoshino | ........... | H01L 21/67046 |
| 2004/0094643 | A1 * | 5/2004 | Bevenhall | ................ | D01G 1/08 |
| | | | | | 241/34 |
| 2019/0111896 | A1 * | 4/2019 | Seibold | .................... | B60S 3/002 |
| 2020/0407088 | A1 * | 12/2020 | White | .................... | B65B 43/36 |
| 2021/0024279 | A1 * | 1/2021 | Surin | ................. | B05B 11/3084 |

FOREIGN PATENT DOCUMENTS

CN        205735569 U    * 11/2016

OTHER PUBLICATIONS

U.S. Appl. No. 16/878,237, "Induction Scoop Pusher", filed May 19, 2020.

* cited by examiner

*Primary Examiner* — Gene O Crawford
*Assistant Examiner* — Lester Rushin, III
(74) *Attorney, Agent, or Firm* — Patterson + Sheridan, LLP

(57) ABSTRACT

Embodiments herein describe a pneumatic mandrel for a packaging system. In one embodiment, the mandrel includes a pneumatic nozzle proximate to a loading volume in which items are disposed before being packaged. The pneumatic nozzle can contain multiple ports for directing airflow in different directions. The directions at which the ports generate the airflow may be selected to move items that may be stuck or snagged into the loading volume. Stated differently, the mandrel may generate airflows in multiple directions for pushing items towards the loading volume.

20 Claims, 8 Drawing Sheets

PNEUMATIC MANDREL FOR A PACKAGING SYSTEM

BACKGROUND

The present invention relates to a pneumatic mandrel, and more specifically, to using directed air pulses to move an item into a loading volume for packaging.

Some packaging systems require an associate or machine to place items into a loading volume where the items are then sealed in a package that then can be mailed to, e.g., fulfill a customer order. For smaller or lighter items, rather than use a rigid container (e.g., a cardboard box), the items may be packaged using a flexible packaging material such as bubble wrap or other padded material. Placing the items into the loading volume so they can be packaged in the flexible material presents many challenges, often caused by the various types of items that need to be packaged. For example, the weight, size, and material of the item may impact the ability of the packaging system to consistently place the item in the loading volume.

BRIEF DESCRIPTION OF DRAWINGS

Various embodiments in accordance with the present disclosure will be described with reference to the drawings, where like designations denote like elements.

DETAILED DESCRIPTION

Embodiments herein describe a pneumatic mandrel for a packaging system. In one embodiment, the mandrel includes a pneumatic nozzle proximate to a loading volume in which items are disposed before being packaged. The pneumatic nozzle can contain multiple ports for directing airflow in different directions. The directions at which the ports generate the airflow may be selected to move items that may be stuck or snagged into the loading volume. Stated differently, the pneumatic nozzle may generate airflows in multiple directions for pushing items towards the loading volume.

While the pneumatic nozzle can be activated continuously so that air (or any suitable gas) constantly flows through its ports, in one embodiment, the packaging system may activate the nozzle for a short period of time to generate bursts of air through the ports. For example, when an associate or machine moves a package into the loading volume, the system may wait until the hand of the associate or the machine moves away from the loading volume (e.g., after dropping the item or pushing the item into the loading volume) before activating the nozzle to generate the airbursts. These airbursts can be directed to locations in the mandrel where the item may get caught or snag when being moved into the loading volume. Generating the airbursts provide sufficient force to free the item and move it into the loading volume. That is, when pushing a light item into the mandrel, a machine may not apply sufficient force to fully move the item into the loading volume. The airbursts can provide additional force to move the item off the mandrel and into the loading volume.

Figure 1:
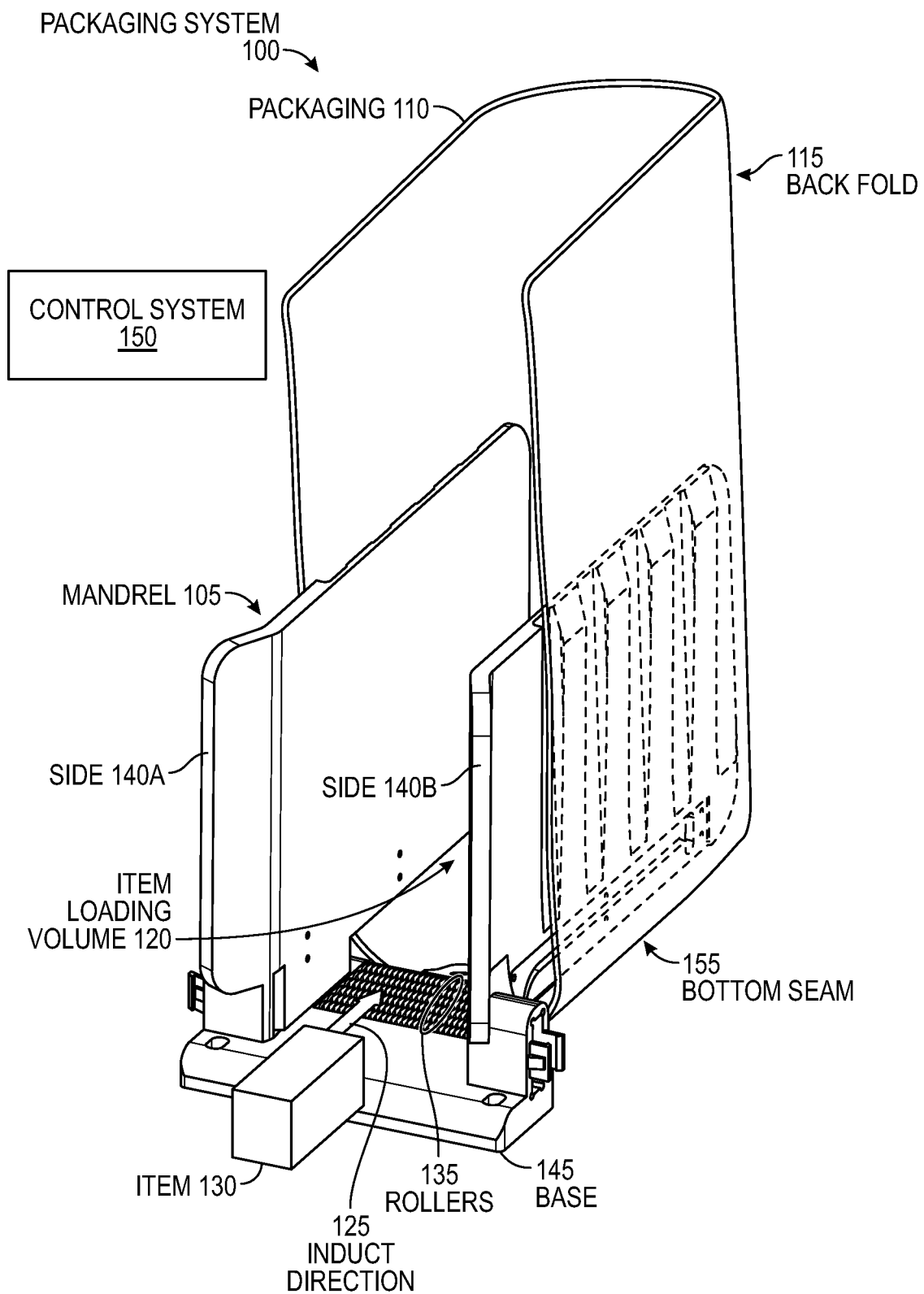
FIG. 1 illustrates a pneumatic mandrel in a packaging system, according to one embodiment described herein.

FIG. 1 illustrates a pneumatic mandrel 105 in a packaging system 100, according to one embodiment described herein. The mandrel 105 provides an item loading volume 120 where an item 130 is placed so that it can be enclosed by packaging 110. In this example, the item 130 is moved along an induct direction 125 (or an induction path) into the loading volume 120. For example, a machine or associate may push the item 130 over a base 145 of the mandrel 105 and the rollers 135 into the loading volume 120. Alternatively, a machine or associate may hold the item 130 until the item is in the loading volume 120 and then drop the item 130. Thus, in some embodiments the rollers 135 are present in the mandrel 105, but may not be used by the associate. In other embodiments, the rollers 135 may be omitted from the mandrel 105.

The mandrel 105 includes sides 140A and 140B extending vertically from the base 145 (e.g., in a direction perpendicular to a top surface of the mandrel 105). As shown, the sides 140A-B separate the packaging 110 (e.g., a flexible packaging material) to form an item loading volume between the packaging 110. That is, the packaging 110 wraps around the two sides 140 such that a back fold 115 (or back seam) of the packaging 110 is opposite a side of the mandrel 105 where the item 130 is inducted. The back fold 115 serves as a back stop to prevent items from exiting the opposite side of the mandrel 105. Further, the two folds of the packaging 110 are sealed together underneath the mandrel 105 at a bottom seam 155. This bottom seam 155 provides support for the item 130 as it moves into the loading volume 120. Put differently, once the item 130 moves over the base 145 and the rollers 145 and into the loading volume 120 along the induct direction 125, the item 130 rests on the bottom seam 155.

Once in the loading volume 120, the packaging system can pull the packaging 110 down such that the item 130 is now below the mandrel 105. That is, in one embodiment, the packaging system 100 includes a feeding system (not shown) above the mandrel 105 that continuously provides packaging 110. The feeding system may include a roll of packaging 110. As the packaging 110 is pulled down (after an item 130 is moved into the loading volume 120), the packaging 110 is folded along the back fold 115 such that one half of the packaging 110 slides along the side 140A while the other half slides along the side 140B.

After pulling the packaging 110 and the item 130 down, a sealing apparatus (not shown) can seal the packaging 110 along an axis that is above the item 130 but still below the mandrel 105. In one embodiment, the sealing apparatus seals two sides of the packaging 110: a top side that is above the item 130 and a front side that is in front of the item 130 (in a direction that is opposite of the induct direction 125). Because the two folds of the packaging 110 were already sealed on a bottom side by the bottom seam 155 and a back side by the back fold 115, sealing the top and the front sides completely encloses the item 130 in the packaging 110, thereby creating a package (or envelope) in which the item 130 can be mailed. For example, a shipping label can be attached to the outside of the packaging 110 and the package can be cut from the remaining packaging 110. That is, the packaging 110 can be cut at the top side to remove the sealed item 130 from the remaining packaging 110.

In one embodiment, sealing the top side of the package also creates the bottom seam 155 for the next item being loading into the mandrel 105. Stated differently, when sealing the top side of the package for the already loaded item 130, the sealing apparatus can create the bottom seam 155 for another package. A machine or associate can then load the next item into the loading volume 120 formed by the bottom seam 155 where the process can repeat—i.e., once loaded, the packaging system 100 can again pull down the packaging 110 so that the item is below the mandrel 105 and the sealing apparatus can seal the top and front sides of the packaging 110 to enclose the item.

Because the sealing apparatus seals the front side of the packaging 110 in order to fully enclose the item in the packaging 110, it is desirable that the item 130 be moved completely off the mandrel 105 and into the loading volume 120. If the item 130 remains partially on the mandrel 105, or is not moved far enough back towards the back fold 115, when sealing the front side of the packaging 110, a portion of the item 130 may be at (or protruding from) the front side. As a result, the sealing apparatus may be unable to form a complete seal at the front side, or may damage the item during the sealing process. To mitigate the likelihood that an item does not fully move into the loading volume 120, in the embodiments below, the mandrel 105 uses one or more directed airflows to help move the package 130 into the loading volume 120.

The packaging system 100 includes a control system 150 which can include hardware, software, firmware, and combinations thereof. For example, the control system 150 may include one or more processors or one or more programmable logic controllers (PLC) for controlling the packaging system 100. In one embodiment, the control system 150 may execute software applications or firmware that control the actions of the various components in the packaging system 100. In general, the control system 150 includes logic for controlling the pneumatics in the mandrel 105, the feeding system, the sealing apparatus, and a machine that inducts the item 130 into the loading volume (assuming that is automated rather than being performed by an associate).

Figure 2:
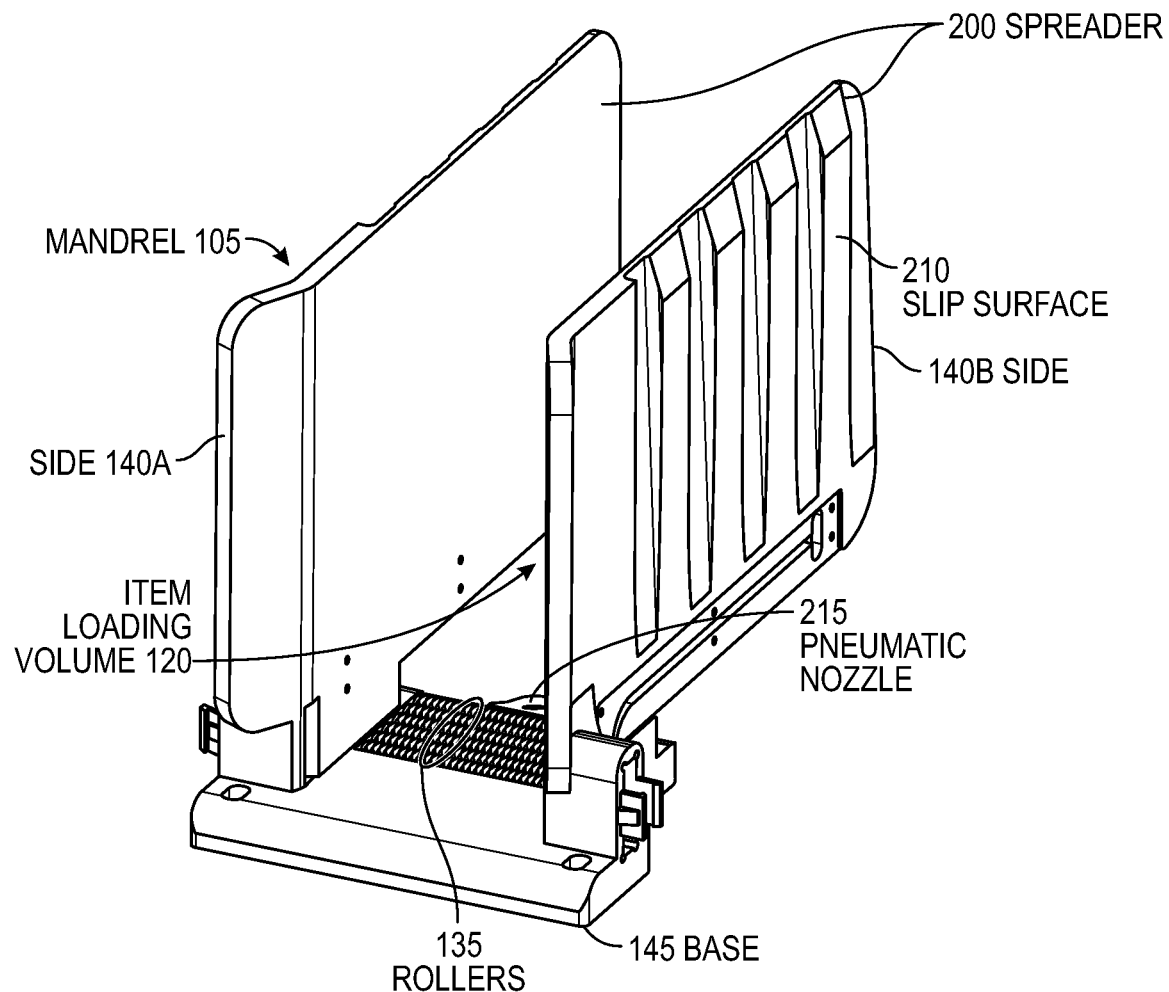
FIG. 2 illustrates the pneumatic mandrel, according to one embodiment described herein.

FIG. 2 illustrates the pneumatic mandrel 105, according to one embodiment described herein. The mandrel 105 in FIG. 2 is the same as the mandrel 105 in FIG. 1. However, the packaging and the item are not shown in FIG. 2 so that the details of the mandrel 105 are more readily visible. As shown, the sides 140A and 140B form a spreader 200 for separating the two folds (e.g., the two sides) of the packaging 110 in FIG. 1. Because the packaging is pulled along the sides 140A-B, the sides 140A-B include slip surfaces 210 for reducing friction between packaging and the sides 140A-B. In this example, the slip surface 210 includes interleaved recesses and ridges. Moreover, the depths of the recesses decrease when moving from a top of the slip surface 210 towards a bottom of the slip surface 210. However, the slip surfaces 210 are not a requirement and can be replaced by flat, smooth surfaces.

The rollers 135 can help to increase the likelihood that items move into the loading volume 120 (and off the mandrel 105). For example, the rollers 135 can reduce the friction between the item and the mandrel 105 relative to a flat surface so that the force pushing the item into the loading volume 120 is sufficient to move the item fully into the loading volume 120.

In this embodiment, the mandrel 105 includes a pneumatic nozzle 215 that extends horizontally from the base 145. The nozzle 215 may be integrated into the base 145 or be a separate component that is attached to the base 145.

The nozzle 215 outputs directed airflows for urging or moving items into the loading volume 120. "Airflows" as used herein can include any flow of gas, which can be air or any other suitable gas. In one embodiment, the pneumatic nozzle 215 generates at least two airflows that are in at least two different directions. Further, the nozzle 215 can output the airflows constantly, or selectively using airburst (e.g., airflows that last for a short duration, such as less than one second). The airbursts can be synchronized with loading the item so when the machine or the associate's hand begins to (or has) moved away from the loading volume 120 and is no long pushing or carrying the item, the airbursts are activated. The details of different techniques for generating directional airflows for moving items into the loading volume 120 are discussed in detail below.

Figure 3A:
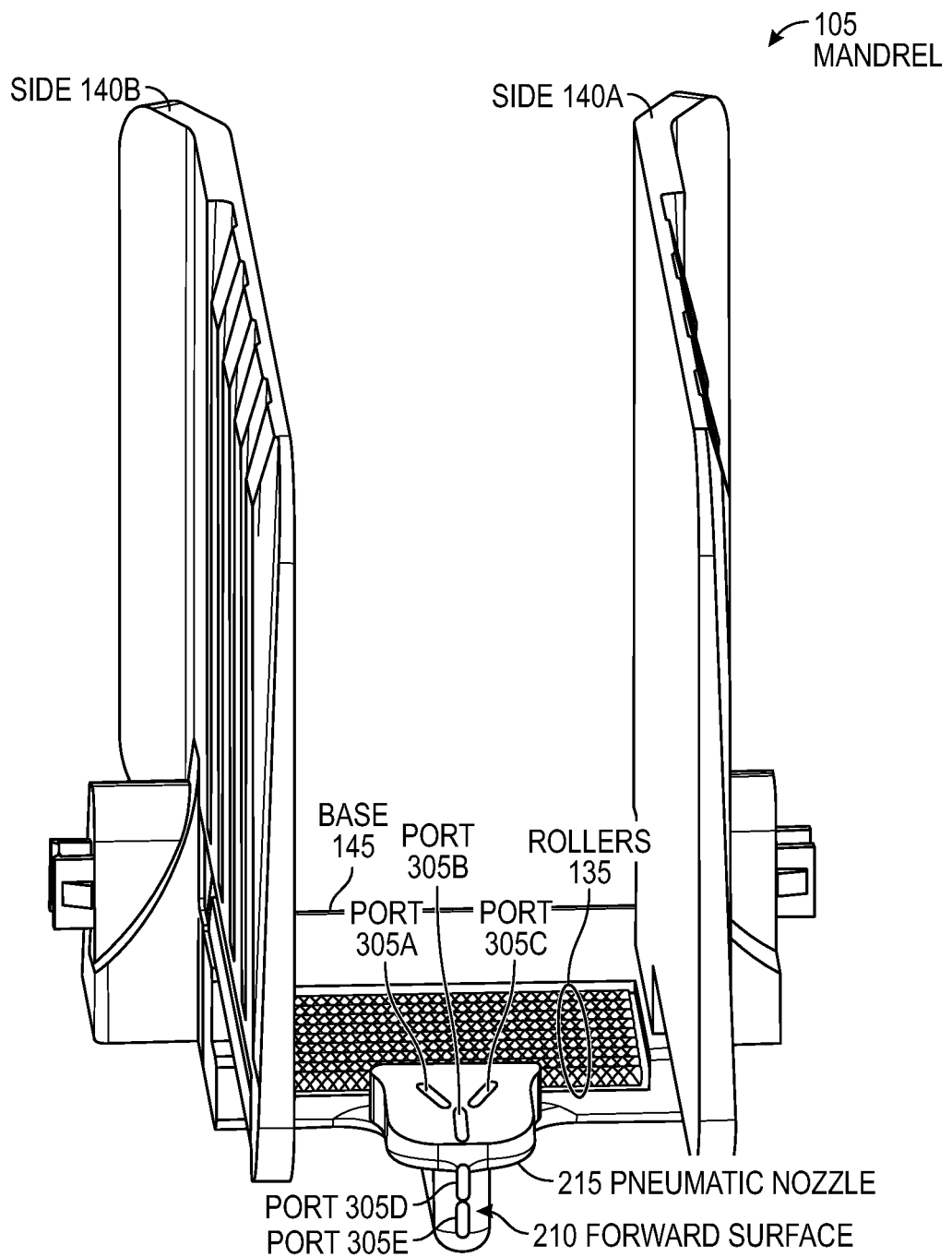
FIGS. 3A and 3B illustrate front views of the mandrel, according to one embodiment described herein.
Figure 3B:
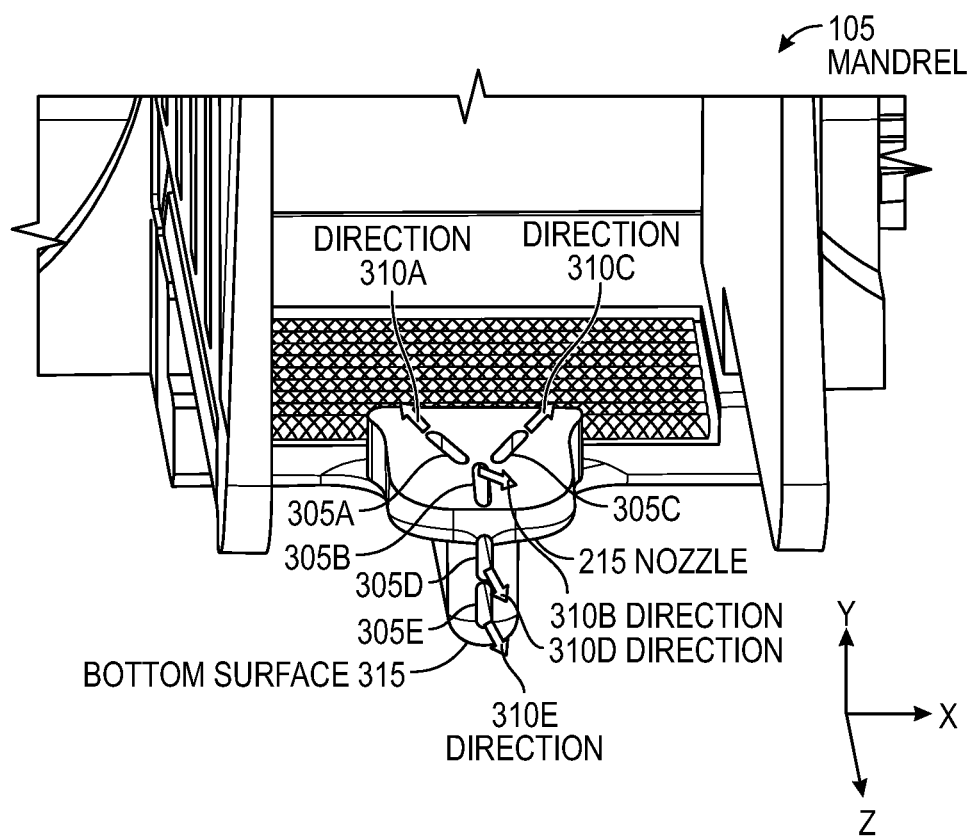

FIGS. 3A and 3B illustrate front views of the mandrel 105, according to one embodiment described herein. That is, while FIGS. 1 and 2 illustrated back views of the mandrel, FIGS. 3A and 3B provide the opposite view which more clearly illustrates the features of the pneumatic nozzle 215.

In FIG. 3A, the nozzle 215 includes five ports 305A-E (collectively labeled ports 305). The ports 305 output directed airflows for moving items into the loading volume which is in a direction out of the page relative to the pneumatic nozzle 215. That is, the nozzle 215 is disposed between the base 145 and the item loading volume. In this example, the ports 305A-C form a Y shape on an upper surface of the nozzle 215 while the ports 305D and 305E are arranged on a forward surface 320 of the nozzle 215 in a facing relationship with the back fold of the packaging (not shown). Moreover, the forward surface 320 is perpendicular to an induction path (shown in FIG. 4 below) which the item follows as it is moved towards the loading volume.

In one embodiment, the ports 305A and 305C are arranged to output airflows for dislodging items that are disposed to the left and right of the nozzle 215. That is, an item (or a portion thereof) when being loaded may end up coming to rest in the areas between the nozzle 215 and one of the sides 140A-B. For example, the item may have snagged or rubbed against the sides 140A-B and did not have enough momentum to fully move into the loading volume. If the item remains in these areas after the packaging is pulled down and sealed, a portion of the item may protrude out of the packaging and thus, prevent sealing the packaging or may be damaged during the sealing process. Thus, the ports 305A and 305C may output airflows which force items from these areas and further back into the loading zone (e.g., further towards the back fold).

The port 305B may be arranged to move items where a portion of those items is disposed above the nozzle 215. For example, the force applied by the machine or associate may not have been sufficient to move the item fully into the loading volume. For instance, the item may be too light or may have aerodynamic properties that cause a force that counters the force applied by the machine or associate (e.g., a thin, flat item such as a gift certificate) which limits the distance the item travels after the machine or associate stop pushing the item. While heavier or more aerodynamic items have sufficient momentum to move fully into the loading volume, lighter or less aerodynamic items may come to rest on the nozzle 215. For those items, the airflow emitted by the port 305B can force the item further towards the back fold of the packaging and away from the front side.

The ports 305E and 305D may be arranged to move items that are immediately disposed in front of the nozzle 215 in a direction out of the page. That is, to prevent the item from interfering with the sealing process or being damaged during the sealing process, the item may need to be moved away from the immediate proximity of the nozzle 215 (e.g., at least a half inch or more in the direction out of the page). The ports 305E and 305D can generate airflows that force any items immediately in front of the nozzle 215 deeper into the loading volume.

As discussed above, it is more likely that lighter items, or items with aerodynamic properties that generate forces that counter the pushing force, will come to rest in the areas around the nozzle 215 (e.g., above, to left or right, or immediately in front of the nozzle 215) which can cause issues when sealing the package. However, these types of items are also more easily moved by the airflows generated by the pneumatic nozzle 215 relative to heavier or more aerodynamic items. Put differently, using airflows (rather than actuators or powered rollers) may be better suited to move the types of items that are more likely to become stuck at undesired locations or areas around the nozzle 215 when being loaded into the packaging.

In one embodiment, the pneumatic nozzle 215 ejects air through the ports 305 at the same time. For example, the ports 305 may share the same feed line which provides pressure to generate the airflows from each of the ports 305 in parallel. These airflows may be activated continuously or in response to a particular event (e.g., a burst of air once a control system detects the machine or associate's hand is moving away from the loading volume). However, in another embodiment, the nozzle 215 can generate airflows from different ports 305 at different times. For example, the nozzle 215 may first output airflows from the ports 305A and 305C (e.g., a short airburst that is less than a second) to dislodge any items that may be to the sides of the nozzle 215. The airflows from the ports 305A and 305C can be deactivated and the airflows for the ports 305B, D, and E are activated. First activating airflows for the ports 305A and 305C may dislodge an item at one of the sides of the nozzle 215 and move the item to a position above or in front of the nozzle 215. Then activating the airflows for the ports 305B, D, and E can further move the item so it is fully in the loading volume. However, this is just one example of sequentially activating the ports 305. For example, it may be advantageous to first output airbursts using the ports 305A-C to move items to an area in front of the nozzle 215 before then output the airbursts using the ports 305D and 305E.

In any case, when activating the ports sequentially, the airflows (or airbursts) may overlap (e.g., a first port outputs its airflow, a second port then outputs its airflow, then the first port stops outputting its airflow), or may be outputted back-to-back (e.g., a first port outputs its airflow, the first port stops outputting its airflow, and a second port immediately outputs its airflow), or may be outputted after a delay (e.g., a first port outputs its airflow, the first port stops outputting its airflow, and a second port outputs its airflow after a predefined delay). Further, when outputting airflows sequentially, the ports 305 that generate airflows at a different time than other ports 305 may have a different feed line from those ports.

FIG. 3B illustrates a zoomed in view of the front of the pneumatic nozzle 215 relative to FIG. 3A. FIG. 3B illustrates different directions 310A-E (collectively referred to as "directions 310") of the airflows output by the ports 305. In this configuration, the port 305A is designed to output an airflow in the direction 310A that is up and to the left (i.e., along the X and Y axes). Also, the direction 310A may also have a component that is out of the page (i.e., along the Z axis) so that an item struck by the airflow moving in the direction 310A is moved toward the loading volume (e.g., in a direction towards the back fold of the packaging).

In this embodiment, the port 305B is designed to output an airflow in the direction 310B that is up and to the right. Also, although it cannot be seen in the view provided by FIG. 3B, the direction 310B may also have a component that is out of the page so that an item struck by the airflow moving in the direction 310B is moved toward the loading volume.

In this embodiment, the port 305C is designed to output an airflow along the direction 310C that is up and out of the page. Thus, an item disposed above the port 305C is directed up and closer to the back fold of the packaging (e.g., into the loading volume).

The ports 305D and 305E are designed to output airflows along parallel directions 310D and 310E that are out of the page, or more generally, towards a back fold of the packaging. Thus, an item in front of the nozzle 214 is pushed further into the loading volume.

FIG. 3B also illustrates a bottom surface 315 of the nozzle 215. This bottom surface 315 can be used to pull the packaging tight. That is, the bottom seam 155 of the packaging 110 illustrated in FIG. 1 can contact the bottom surface 315. Thus, when the feeding system disposed above the mandrel 105 pulls the packaging 110 in the upwards direction (i.e., along the Y axis), the bottom seam 155 is held by the bottom surface 315, thereby permitting the feeding system to pull the packaging 110 taut. It may be advantage to pull the packaging taut using the bottom surface 315 when loading an item into the loading volume since this may reduce the likelihood that the item gets snagged or stuck on the packaging, which in turn may cause the item to come to rest on the mandrel 105 or the areas immediately surrounding the nozzle 215 (e.g., above (along the Y axis), to left or right (along the X axis), or in front of the nozzle 215 (along the Z axis)). Nonetheless, if an item does get stuck in one of these areas, the airflows generated by the ports 305 in the directions 310 illustrated in FIG. 3B can move the item into the loading volume.

Figure 4:
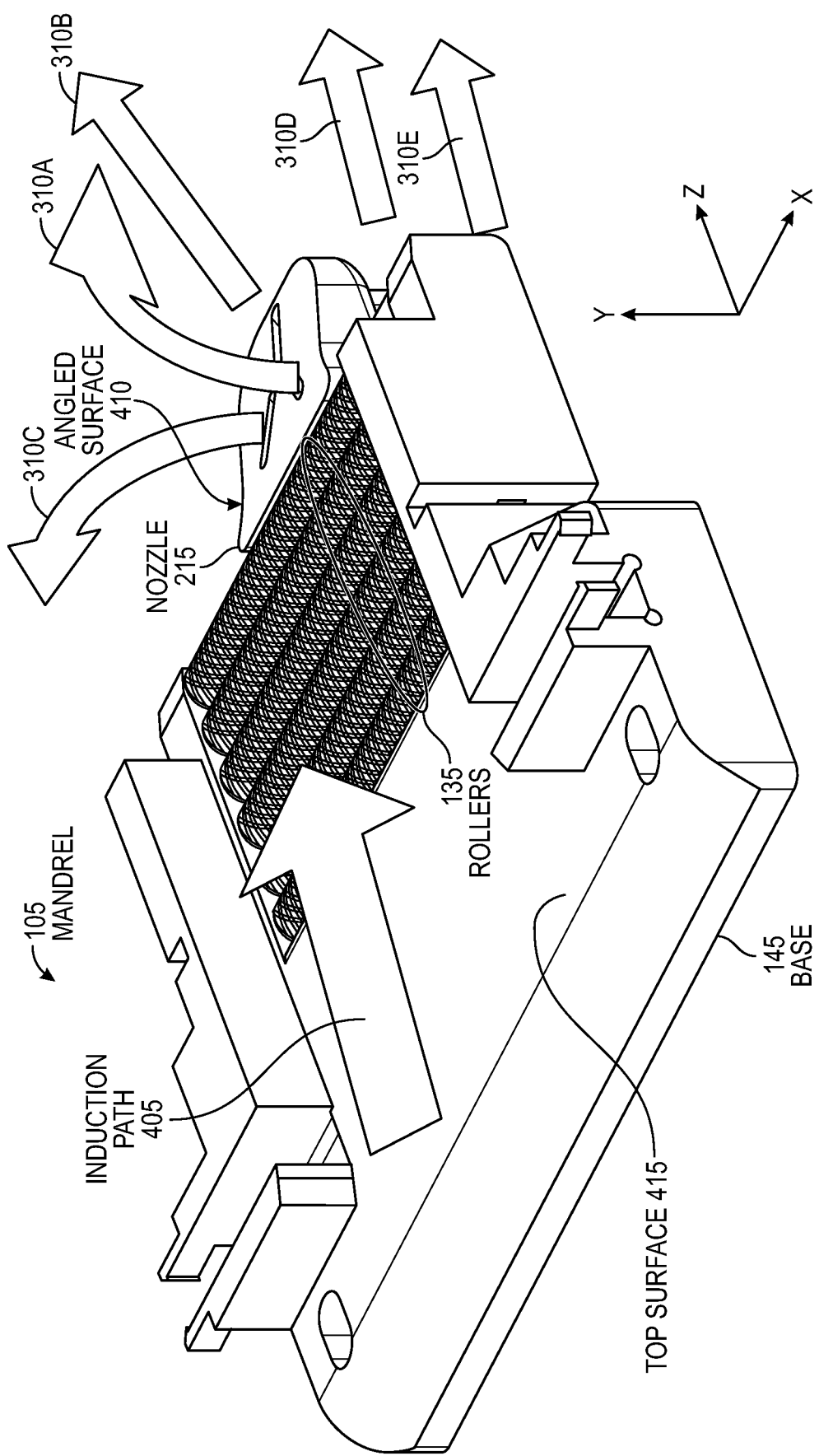
FIG. 4 illustrates vectors of airflow generated by a pneumatic nozzle in the mandrel, according to one embodiment described herein.

FIG. 4 illustrates directions 310 of airflows generated by the pneumatic nozzle 215 in the mandrel 105, according to one embodiment described herein. In contrast to the forward view of the pneumatic nozzle 215 in FIGS. 3A and 3B, FIG. 4 provides a view of the nozzle 215 from the back and the side. For clarity, the sides 140 of the mandrel 105 have been omitted from FIG. 4.

FIG. 4 illustrates an induction path 405 of the item as it moves across a top surface 415 (which can include the rollers 135) of the base 145. Further, FIG. 4 illustrates that the nozzle 215 has an angled surface 410 relative to the top surface 415. For example, the angled surface 410 may be angled 5 to 30 degrees downward relative to the top surface 415. Angling the surface 410 may help to move items off the mandrel 105 and into the loading volume. For example, when following the induction path 405, items may slide move over the top surface 415, the rollers 135, and then slide down the angled surface 410 and onto the bottom seam of the packaging. Further, if items come to rest on the angled surface 410, it may require less force from the airflows to dislodge the item and move it into the loading volume than if the nozzle 215 had a top surface that was parallel with the top surface 415. In addition, angling the surface 410 may help when designing the ports 305 to generate airflows in the desired directions 310. For example, the angled surface 410 may help the ports 305 to generate airflows that have a directional component along the Z axis so that the item is pushed towards the loading volume.

Figure 5:
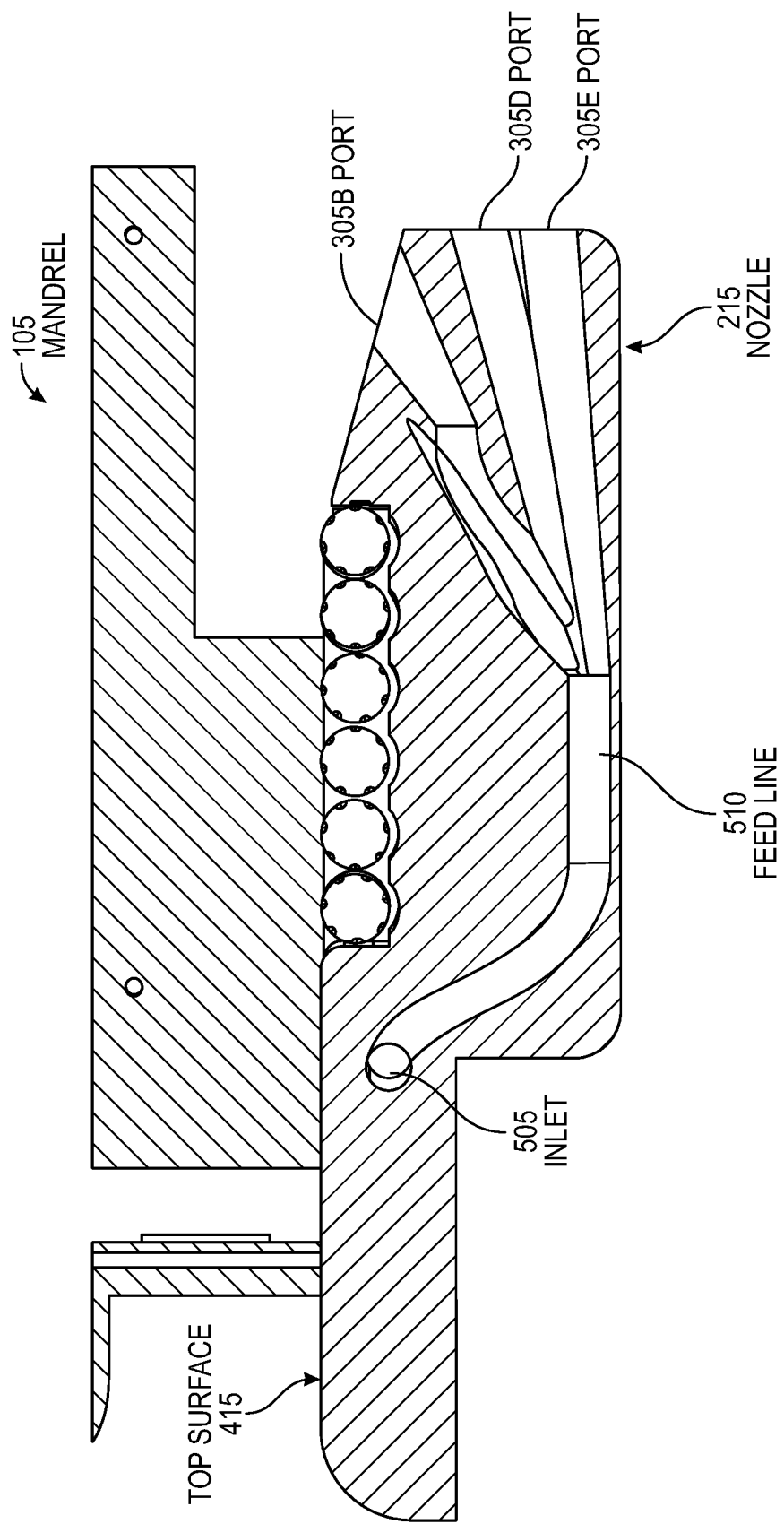
FIG. 5 illustrates a cross sectional view of the mandrel, according to one embodiment described herein.

FIG. 5 illustrates a cross sectional view of the mandrel 105, according to one embodiment described herein. The cross sectional view is based on a cross section of the middle of the mandrel along the Z axis illustrated in FIG. 4. FIG. 5 illustrates an inlet 505 that permits the mandrel 105 to interface with a hose or tube that can provide pressurized air to the mandrel 105.

A feed line 510 provides a path between the inlet 505 and the ports 305B, D, and E. Although not shown in this view, the feed line 510 may also connect to the other ports in the nozzle 215. That is, the ports 305 can all share the same feed line 510 such that the pressurized air received at the inlet 505 is distributed among the ports 305. However, this is not a requirement and each port 305 (or different groups of the ports 305) can have different feed lines and inlets so the airflow can be sequentially activated.

Figure 6:
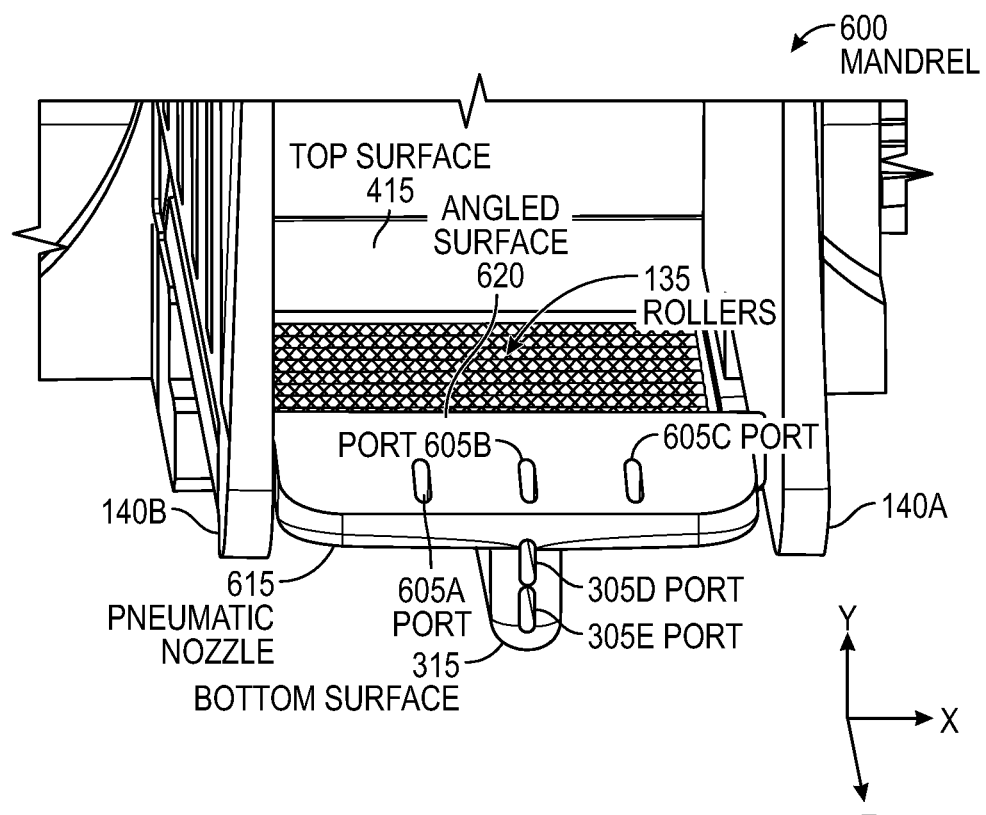
FIG. 6 illustrates a front view of a mandrel, according to one embodiment described herein.

FIG. 6 illustrates a front view of a mandrel 600, according to one embodiment described herein. The mandrel 600 generally has the same structure as the mandrel 105 illustrated in FIGS. 1-4 except that the mandrel 600 has a different pneumatic nozzle 615. Instead of the nozzle having a smaller width (in the X axis) than the rollers 135, in this embodiment, the nozzle 615 has a width similar to the rollers 135. That is, the nozzle 615 can extend to (or almost to) the sides 140A and 140B of the mandrel 600.

The nozzle 615 includes an angled surface 620 similar to the angled surface 410 illustrated in FIG. 4. The angled surface 620 (which is angled relative to the top surface 415) can provide a slide for helping to ensure items move off the mandrel 600 and into the loading volume. Further, the surface 620 includes the ports 605A-C for outputting airflows for moving items that may be disposed (or stuck) on the nozzle 615 or immediately in front of the nozzle 615. For example, the ports 605A-C may be arranged to generate airflows in a direction that is up (along the Y axis) and out of the page (along the Z axis) to dislodge and move items into the loading volume. The nozzle 615 also includes the ports 305D-E as discussed above.

The ports 605A-C and 305D-E can be activated at the same time (and thus, share the same feed line) or may be activated sequentially (e.g., individually or in groups). For example, the ports 605A-C may activate first then followed by the ports 305D-E, or conversely, it may be better to activate the ports 305D-E first, followed by the ports 605A-C. Further, rather than have three ports 605A-C, the angled surface 620 may include one port, which may be elongated to extend across the length of the surface 620 (in the horizontal direction).

One advantage of using the nozzle 615 rather than the nozzle 215 illustrated in the previous figures is that the nozzle 615 extends between the sides 140A-B, and thus, may make it less likely that items get stuck in the areas to the right and left of the nozzle 615. That is, because the angled surface 620 of the nozzle 615 extends between the sides 140A-B, items are less likely to get stuck in an area between the nozzle 615 and the sides 140A-B. However, one potential disadvantage of the nozzle 615 relative to the nozzle 215 is that the greater width of the nozzle 615 may interfere with the movement of the packaging as it slides along the sides 140A-B and comes to together to form a bottom seam under the bottom surface 315. Thus, the width of the nozzle 615 may be shorter than shown in FIG. 6 to not interfere with the packaging but wider than the nozzle illustrated in the previous figures. If the width of the nozzle 615 is reduced in other embodiments, the arrangement of the ports 605A-C on the angled surface 620 may be similar as shown in FIG. 6 (although the spacing between the ports 605A-C may be reduced).

Further, while the figures above illustrate two different designs of a nozzle to generate multi-directional airflows for moving items into the loading volume, other embodiments are also possible. In one embodiment, rather than using the nozzle to generate airflows, ports can be formed in the sides 140A-B of the mandrel 105 that generate airflows that move the items from the problem areas discussed above and into the loading volume. Further, the mandrel may include both ports in the sides 140A-B as well as one or more of the ports 305 in the nozzle to generate airflows for moving the items into the loading volume.

Figure 7:
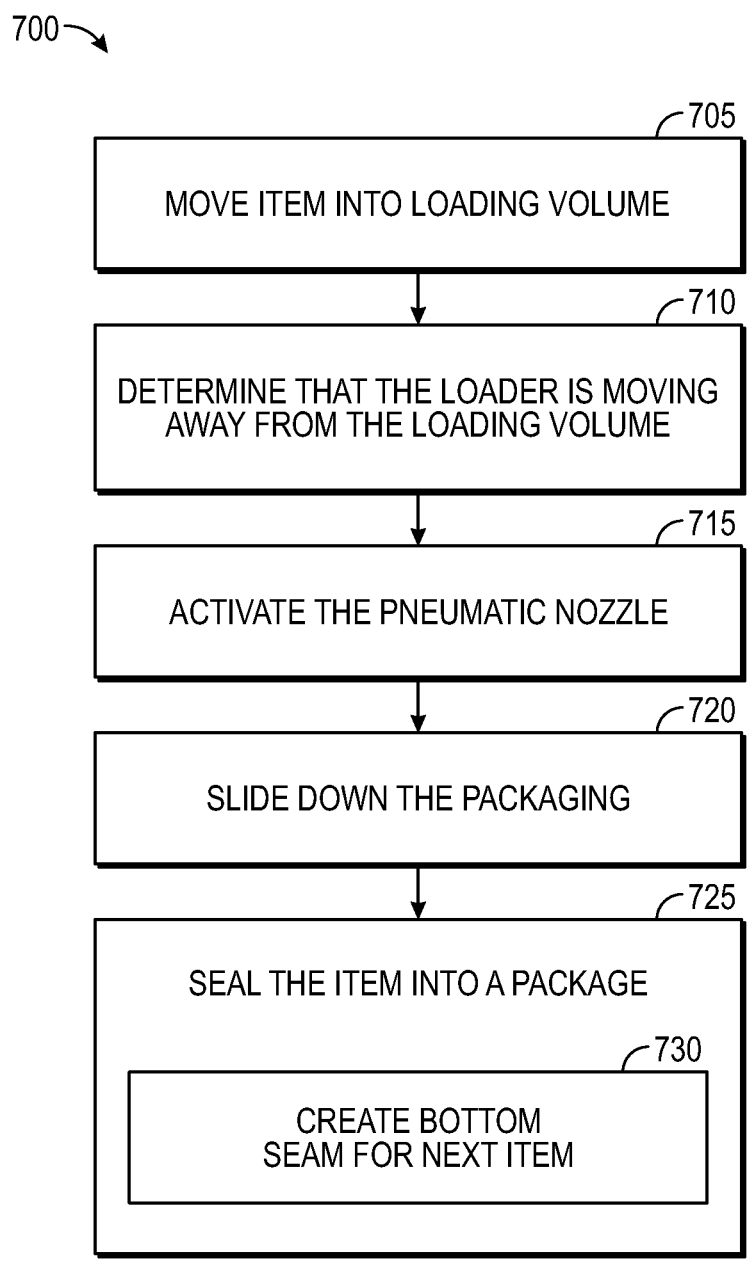
FIG. 7 is a flowchart for controlling the pneumatic mandrel, according to one embodiment described herein.

FIG. 7 is a flowchart of a method 700 for controlling the pneumatic mandrel, according to one embodiment described herein. In one embodiment, the method 700 is performed using the control system 150 illustrated in FIG. 1, and thus, various blocks in method 700 may be performed by computer hardware, software, firmware, or mechanical components (e.g., mandrel, feeding system, sealing apparatus, etc.).

At block 705, a machine or associate moves an item into a loading volume defined by the sides of the mandrel. That is, the sides of the mandrel form a spreader that separates two sides (or folds) of the packaging so that the item is placed between the packaging. In one embodiment, the sealing apparatus already formed a bottom seam on which the item is disposed.

However, as discussed above, the item (or a portion thereof) may not make it into the loading volume for whatever reason. If the packaging where sealed with the item in its current position, the seal may be incomplete or the item may be damaged. Thus, the method 700 includes taking steps, using a pneumatic system, to ensure the item is moved fully into the loading volume.

At block 710, the control system determines that the loader is moving away from the loading volume. The loader may be a machine that pushes (or carries) the item across the mandrel and into the loading volume, or an associate who grabs the item and drops it into the loading volume. If the loader is a machine, the control system can determine that the loader is moving away from the loading volume once it begins to move in a direction away from the loading volume. That is, when moving the item into the loading volume at block 705, the machine may move in a first direction, but when returning to retrieve another item, the machine moves in a second, opposite direction. The control system may determine when the loader moves in the second direction.

If the loader is an associate, the control system can include a sensor (e.g., an optical eye) that determines when the associate's hand moves into the mandrel to reach the loading volume and when her hand moves out of mandrel, and thus, the associate is moving away from the loading volume.

At block 715, in response to determining the loader is moving away from the loading volume, the control system activates the pneumatic nozzle in the mandrel. As mentioned above, the pneumatic nozzle may include multiple ports that generate airflows in multiple, different directions. For example, the nozzle 215 in FIG. 4 outputs airflows in four different directions while the nozzle 615 in FIG. 6 outputs airflows in at least two different directions. Further, although method 700 specifically recites using a pneumatic nozzle, the mandrel may alternatively (or in combination) include ports in the sides of the mandrel for generating airflows at different directions to move items into the desired loading volume.

Further, the airflows in the pneumatic nozzle may activate at the same time or sequentially (e.g., a first burst from a first port, a second burst from a second port, a third burst from a third port, and so forth). In the method 700, the pneumatic nozzle is activated every time the loader moves an item into the mandrel.

While the method 700 describes activating the airflows in response to determining the loader is moving away from the loading volume, the airflows may be activated in response to other events such as the control system identifying that the item is stuck in an undesirable location. For instance, the control system may include a light curtain disposed above and/or in front of the nozzle that can identify when an item has not fully moved in the loading volume. If the light curtain is broken by the item (e.g., for a predetermined amount of time), the control system activates the pneumatic nozzle. In another example, the packaging system may include a camera and visual detection algorithm which identifies the location of the item when loaded into the mandrel and whether the item has fully moved into the loading volume. If not, the control system activates the pneumatic nozzle. In these examples, the pneumatic nozzle is activated only when the control system determines an item has not moved fully into the loading volume.

At block 720, the control system instructs the packaging system to pull down the packaging. For example, a clamp or grasping apparatus can grab the bottom seam of the packaging and pull the packaging down such that there is a predefined separation distance between the loaded item and the bottom surface of the mandrel.

At block 725, the control system instructs the sealing apparatus to seal the item to form a package. In one embodiment, the sealing apparatus seals a top side and a front side of the package, since a bottom side (i.e., the bottom seam) and back side (e.g., the back fold) of the package are already sealed. The package can then be removed from the remaining packaging, e.g., by cutting the packaging at the top side of the package.

In one embodiment, when sealing the item into a package, the method 700 also performs block 730 in parallel where the sealing apparatus creates a new bottom seam for a package for the next item. That is, when sealing the top side of the current package, the sealing apparatus can form a bottom seam for the next package and item. The method 700 can then repeat.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A mandrel for a packaging system, the mandrel comprising:
   a spreader comprising a first side and a second side arranged such that a flexible packaging material slides on respective surfaces of the first and second sides, wherein the first and second sides spread the flexible packaging material to form an item loading volume arranged between the flexible packaging material;
   a base, wherein the first and second sides extend vertically from a top surface of the base; and
   a pneumatic nozzle disposed between the base and the item loading volume, wherein the pneumatic nozzle comprises at least two ports arranged to output airflows in different directions to move an item inserted into the mandrel towards the item loading volume.

2. The mandrel of claim 1, wherein the top surface of the base and the pneumatic nozzle are part of an induction path the item travels when moving into the item loading volume.

3. The mandrel of claim 2, wherein the pneumatic nozzle comprises a first surface that is angled relative to the top surface of the base.

4. The mandrel of claim 3, wherein a first port of the at least two ports is disposed on the first surface.

5. The mandrel of claim 4, wherein a second port of the at least two ports is disposed on the first surface, wherein the first and second ports direct respective ones of the airflows in different directions.

6. The mandrel of claim 5, wherein a third port of the at least two ports is disposed on a second surface of the pneumatic nozzle that is perpendicular to the induction path, wherein the third port directs one of the airflows in a different direction than the airflows output from the first and second ports.

7. An apparatus, comprising:
   a base comprising a top surface over which items are moved to reach an item loading volume;
   a first side and a second side extending vertically from the base, wherein the item loading volume is disposed between the first and second sides; and
   at least two ports arranged to output airflows in different directions to move an item inserted into the apparatus towards the item loading volume.

8. The apparatus of claim 7, wherein the first and second sides comprise respective surfaces for spreading a flexible packaging material, wherein the item loading volume is disposed between the flexible packaging material, wherein, when the flexible packaging material is sealed, the items are enclosed within the flexible packaging material.

9. The apparatus of claim 7, further comprising:
   a nozzle extending from the base towards the item loading volume and is between the first and second sides, wherein the at least two ports are disposed on the nozzle.

10. The apparatus of claim 9, wherein the nozzle comprises a first surface arranged at an angle relative to the top surface of the base, wherein the top surface and the first surface are part of an induction path over which the items move to enter the item loading volume, and wherein the at least two ports are disposed on the first surface.

11. The apparatus of claim 10, further comprising a second port disposed on the first surface of the nozzle, wherein the at least two ports and the second port form a Y-shape on the first surface.

12. The apparatus of claim 10, further comprising a second port disposed on a different surface of the nozzle than the first surface, wherein the second port outputs an airflow in a direction different from the directions of the airflows output by the at least two ports.

13. The apparatus of claim 9, further comprising:
a plurality of rollers disposed between the top surface and the nozzle.

14. The apparatus of claim 9, further comprising:
a feed line extending through the base and the nozzle, wherein the feed line couples at least one of the two ports to an inlet configured to receive pressurized air.

15. The apparatus of claim 7, wherein the at least two ports are disposed on at least one of the first and second sides.

16. An apparatus, comprising:
a base comprising a top surface over which items are moved to reach an item loading volume;
a first side and a second side extending vertically from the base, wherein the item loading volume is disposed between the first and second sides; and
a nozzle extending from the base towards the item loading volume, wherein the nozzle comprises a first port arranged to output an airflow to move an item inserted into the apparatus towards the item loading volume.

17. The apparatus of claim 16, wherein the first and second sides comprise respective surfaces for spreading a flexible packaging material, wherein the item loading volume is disposed between the flexible packaging material, wherein, when the flexible packaging material is sealed, the items are enclosed within the flexible packaging material.

18. The apparatus of claim 16, wherein the nozzle comprises a second port arranged to output an airflow to move an item inserted into the apparatus towards the item loading volume, wherein a direction of the airflow output by the second port is different than a direction of the airflow output by the first port.

19. The apparatus of claim 18, wherein the first and second ports are disposed on a same surface of the nozzle.

20. The apparatus of claim 19, wherein the same surface and the top surface of the base are part of an induction path over which the item moves to enter the item loading volume, wherein the same surface is disposed at an angle relative to the top surface.

* * * * *